No. 779,834.

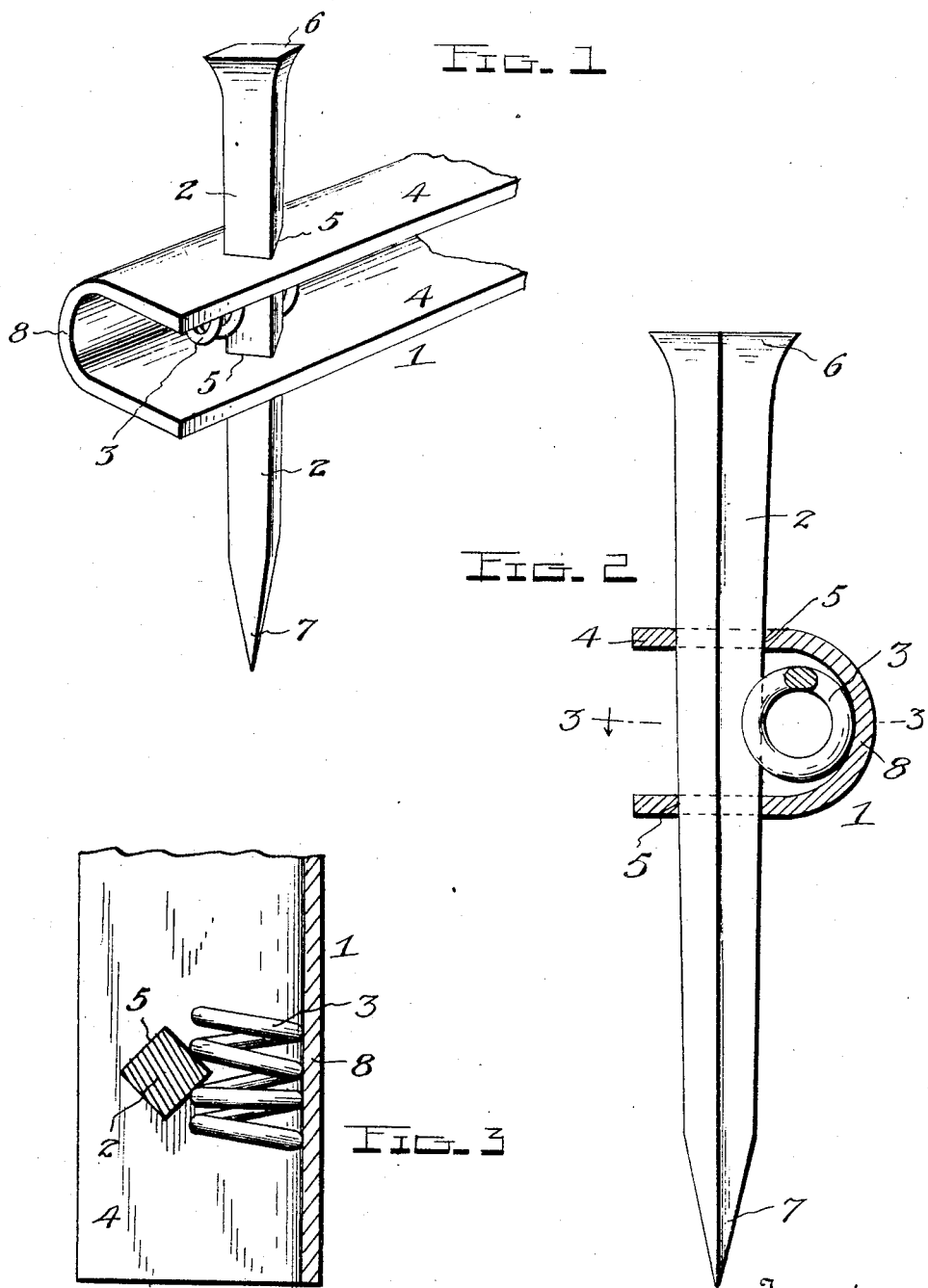

Patented January 10, 1905.

UNITED STATES PATENT OFFICE.

GEORGE E. BLAINE, OF PIQUA, OHIO, ASSIGNOR TO THE BLAINE HARROW MANUFACTURING COMPANY, OF PIQUA, OHIO.

HARROW-TOOTH FASTENER.

SPECIFICATION forming part of Letters Patent No. 779,834, dated January 10, 1905.

Application filed November 3, 1904. Serial No. 231,273.

*To all whom it may concern:*

Be it known that I, GEORGE E. BLAINE, a citizen of the United States, residing at Piqua, in the county of Miami and State of Ohio, have invented certain new and useful Improvements in Harrow-Tooth Fasteners; and I do declare the following to be a full, clear, and exact description of the invention, such as will enable others skilled in the art to which it appertains to make and use the same.

My invention relates to improvements in harrow-tooth fasteners; and it consists in the construction, combination, and arrangement of devices hereinafter described and claimed.

The object of my invention is to provide a simple, efficient, durable, and inexpensive fastener for spike-tooth harrows of that class which are constructed of metal.

The above and other objects, which will appear as the nature of my invention is better understood, are accomplished by means of the construction illustrated in the accompanying drawings, in which—

Figure 1 is a perspective view of a portion of the tooth-bar of a harrow, showing a spike-tooth secured thereto in accordance with my invention. Fig. 2 is a vertical transverse sectional view of the same, and Fig. 3 is a horizontal sectional view taken on the line 3 3 of Fig. 2.

Referring to the drawings by numeral, 1 denotes a portion of the usual transversely-disposed bar of a harrow upon which the teeth are secured. 2 denotes one of the spike-teeth, and 3 denotes the fastening device, here shown in the form of a coil-spring. The tooth-bar 1 is in the form of a U-shaped channel-iron bar, and in its two flanges 4 are formed registering openings 5, through which the spike-tooth 2 is passed. Said openings conform in shape to that of the cross-section of the spike-tooth 2, which in the present instance is square. Said tooth is of the usual form, having a headed upper end 6 and a lower tapered end 7. The tooth is retained in the openings 5 by the coil-spring 3, which is interposed between the closed side 8 of the U-shaped channel-bar and the spike-tooth 2, the latter being disposed so that two of the coils of the spring engage opposite faces of said tooth, as clearly shown in Fig. 3 of the drawings. It will thus be seen that the tooth will be firmly held in the openings in the flanges 4 of the U-shaped bar and at the same time may be readily adjusted or removed.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. The combination with a channeled bar, of a harrow-tooth passed through said channeled bar, and a coil-spring for retaining said tooth in said channeled bar, substantially as described.

2. The combination with a channeled bar formed with alining openings, of a harrow-tooth passed through said openings, and a coil-spring in said channeled bar having two of its coils engaged with said tooth to retain the latter in said openings.

3. The combination with a U-shaped channeled bar formed in its flanges with alining openings, of a spike-tooth passed through said openings, and a coil-spring interposed between the closed side of said channeled bar and the spike-tooth and having two of its springs engaged with said spike-tooth to retain the latter in said openings.

4. The combination with a U-shaped channel-iron harrow-bar formed in its flanges with alining rectangular openings, of a spike-tooth of rectangular form in cross-section passed through said openings, and a coil-spring interposed between the closed side of said channel-iron and said spike-tooth and having two of its coils engaged with one edge of said spike-tooth to retain the latter in said channel-iron, substantially as described.

5. The combination with a beam having a recessed portion, of a harrow-tooth passed through said portion, and a coil-spring located in said portion and having its coils engaged with said tooth to retain the latter in said beam, substantially as described.

In testimony whereof I have hereunto set my hand in presence of two subscribing witnesses.

GEORGE E. BLAINE.

Witnesses:
J. A. SNYDER,
EUGENE JOHNSON.